May 26, 1964
F. W. MURPHY ETAL
3,134,866
MEASURING CHAMBER LIQUID LEVEL SWITCH WITH
DUAL GLASS VIEWING PANELS
Filed April 17, 1961
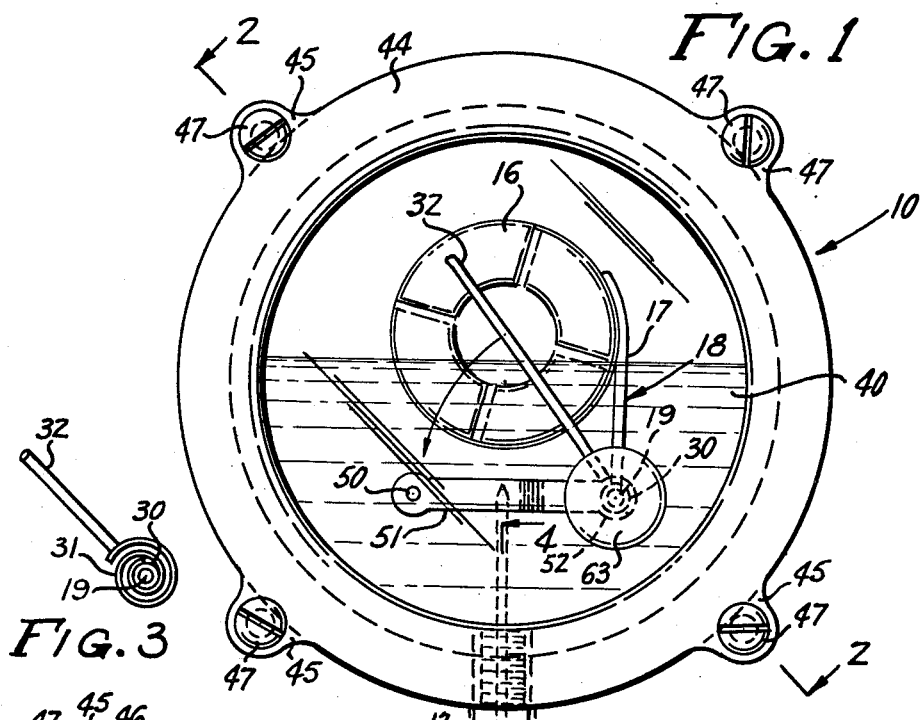
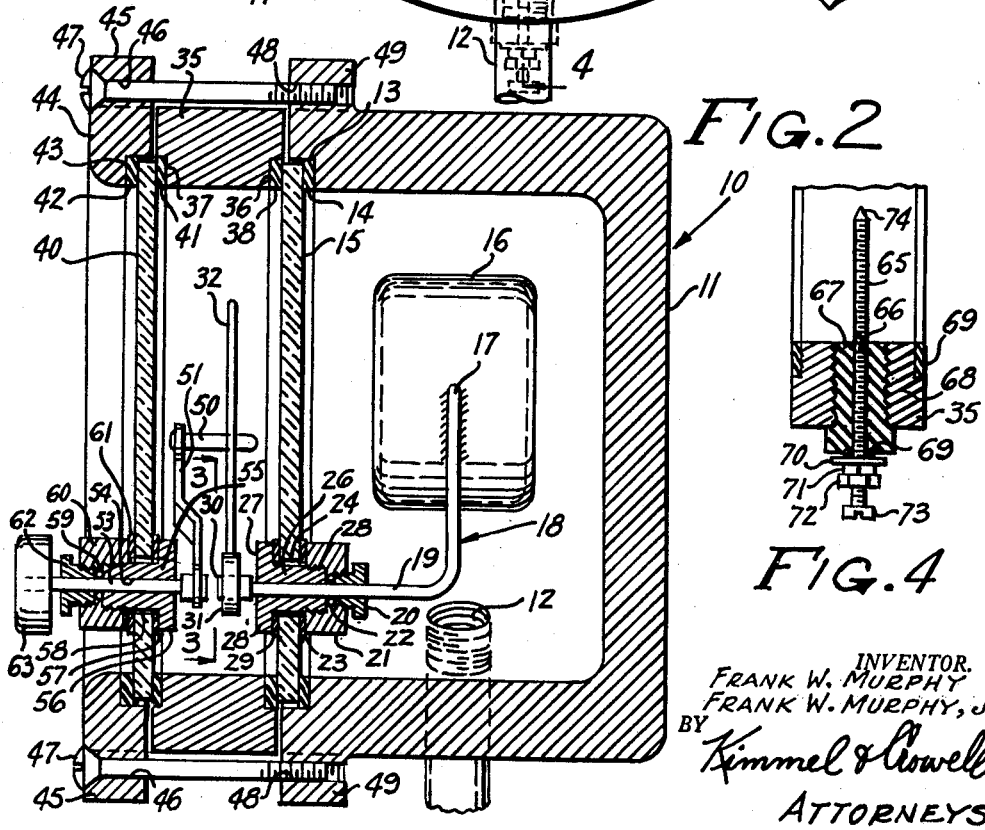
INVENTOR.
FRANK W. MURPHY
FRANK W. MURPHY, JR.
BY
Kimmel & Crowell
ATTORNEYS.

United States Patent Office 3,134,866
Patented May 26, 1964

3,134,866
MEASURING CHAMBER LIQUID LEVEL SWITCH WITH DUAL GLASS VIEWING PANELS
Frank W. Murphy and Frank W. Murphy, Jr., both of Box 4537, Tulsa, Okla.
Filed Apr. 17, 1961, Ser. No. 103,494
1 Claim. (Cl. 200—84)

This invention relates to a liquid level switch-gauge, and has as its primary object the provision of an improved gauge which clearly indicates the level being measured, and which is provided with an adjustable contact means to sound an alarm, or shut down machinery, when levels reach a predetermined undesirable high or low point.

An additional object of the invention is the provision of such a device which may be used to indicate the level of a liquid such as water or the like, which does not have dielectric properties.

As conducive to a clearer understanding of this invention, it may here be pointed out that heretofore gauges of this nature have been naturally limited to lubricating oil or other liquids which have dielectric properties. It has been impossible to use them on water levels, such as engine cooling systems or the like, due to the fact that water with a small concentration of minerals would complete a circuit to the ground. An important object of this invention is, therefore, the provision of an inexpensive and readily installed liquid level switch-gauge which may be used not only on engine water cooling system, but on any other liquid in which the contact would normally not be satisfactorily employed.

An additional object of the invention is the provision of such a device, which when used on low water shut-down or alarm, provides a fail safe factor, in that if the float develops a leak, or is collapsed by pressure, it allows the switch to operate instantly.

A further object of the invention is the provision of a device of this character which is sturdy and durable in construction, reliable and efficient in operation, and relatively simple and inexpensive to manufacture, assemble and utilize.

Still other objects reside in the combinations of elements, arrangements of parts, and features of construction, all as will be more fully pointed out hereinafter and disclosed in the accompanying drawings wherein:

FIGURE 1 is a front elevational view of one form of device embodying elements of the instant invention, an alternative construction being indicated in dotted lines.

FIGURE 2 is a sectional view taken substantially along the line 2—2 of FIG. 1 as viewed in the direction indicated by the arrows.

FIGURE 3 is a fragmentary plan view of a constructional detail; and

FIGURE 4 is an enlarged sectional view taken substantially along the line 4—4 of FIG. 1 as viewed in the direction indicated by the arrows.

Similar reference characters refer to similar parts throughout the several views of the drawings.

Having reference now to the drawings in detail, the device of the instant invention is generally indicated at 10, and comprises a measuring chamber or casing 11, having an inlet 12 for water or other fluid to be measured. The casing 10 is provided on its front face with an annular groove 13, within which seats an inner sealing gasket 14 and a first glass panel 15 completely closing the interior of the casing defining the measuring chamber. A float 16 is positioned interiorly of the casing 11 and is secured to one leg 17 of an L-shaped member generally indicated at 18, the other leg 19 of which extends through a threaded bushing 20, the latter having a suitable bore therein, which in turn is secured in an inner threaded bore in a bearing support 21 which is provided with an interiorly positioned O ring 22. A gasket 23 is positioned interiorly of the bearing support 21 against the face of the panel 10. First glass panel 15 is apertured as at 24 to accommodate an inwardly extending projection 26 on an outer bearing support 27, the latter being threaded to engage in the internal threaded bore 28 of bearing support 21. A second sealing gasket 29 is provided on the exterior surface of glass panel 15 and seats beneath the flange 28' of member 27.

An enlarged boss 30 is positioned on the inner end of leg 19 of member 18, and has secured thereto one end of a coil spring 31, to the other end of which is secured a contact pointer 32, which may be electrically associated with any desired alarm or shut down switch or the like.

A contact casing 35 is provided with an inner cut away portion 36 and an outer cut away portion 37, the portion 36 being aligned with the cut away portion 13 of casing 11, and containing a gasket 38 which seats on the opposite side of glass panel 15. A second panel 40 seats against the gasket 41 and cutaway portion 37, and is clampingly held in position through a gasket 42 by the groove 43 in a bezel 44 which is provided with a second flanged ring 45 having fastening bolt means comprising screw bolt means 47 and bolt holes 46 therein for the accommodation of bolts 47 which extend through screw means of bolt holes 48 and a corresponding flange 49 of casing 11.

A contact arm 50 is carried by an offset plate 51, and positioned to be engaged by the arm 32, any suitable electrical contact being provided with the arm 51 for closing the circuit to actuate either an alarm or a shut down switch. The plate 51 is mounted on a collet 52 which is carried by a shaft 53 which extends through a suitable bore 54 and a bearing support 55, which latter has a flange 56 which seats against the gasket 57, surrounding an opening 58 in second glass panel 40. An O ring 59 is provided in a bearing retainer member 60 which seats against the gasket 61 exteriorly of second glass panel 40, and which is internally threaded to receive a threaded bushing 62 which seats against the opposite side of the O ring 56.

An adjusting knob 63 is provided on the end of the shaft 52 and permits variation of the plate 51, and consequently the pin 50 to vary the water level to which the contacts will respond to make or break a circuit.

An alternative adjustment member is shown in FIGURE 4 wherein a threaded screw 65 extends through a bore 66 in a threaded bushing 67 which seats in a retainer 68, which latter is sealed by a gasket 69 in an opening in the wall of contact case annulus 35. An O ring 69 engages about the outer extremity of the threaded member 65 and is secured in position by washer 70 which is held in position by a pair of locking nuts 71 and 72, the arrangement being such that by means of a head 73 the position of the point 74 of screw 65 may be suitably adjusted to vary the position of plate 51 and its associated pin 50, and subsequently locked in position by means of the lock nuts 71 and 72. The entire space interiorly of the contact casing or first ring 35 between the panels 40 and 15 is filled with oil, which by virtue of the previously described arrangement, is effectively sealed therein, to prevent any sparking or seepage into the casing by water from the interior of the contact 11.

It will thus be seen that there is herein provided an improved liquid level-gauge which accomplishes all of the objects of this invention, and others, including many advantages of great practical utility and commercial importance.

It is to be understood that the device could be installed in any desired locality, as for example, on a radiator or other portion of the cooling system of an internal combustion engine, and could serve several important functions. Firstly, it could sound an alarm to add water when the coolant got low, or to shut down the engine if dangerous low conditions were not corrected. By the addition of a suitable high contact which could be done with a minimum of effort and difficulty, overfilling could be prevented.

As many modifications may be made in this inventive concept, and as many embodiments may be made in the modifications herein shown and described, it is to be understood that all matter herein is to be interpreted merely as illustrative, and not in a limiting sense.

We claim:

A liquid level switch comprising in combination a generally cylindrical casing having a closed end and an open front end, a first glass panel sealingly closing said open end to define a measuring float chamber, said first glass panel having an opening therein, a sealing bushing in said opening, an L-shaped shaft horizontally extending through said bushing, a float carried by the other leg of said shaft in said measuring float chamber, said measuring chamber having an opening therein for the entry of fluid, raising and lowering of the fluid level, raising and lowering said float to rotate said one leg of said shaft, a first annular ring having one edge sealingly affixed to said first panel and said casing and coaxial with said cylindrical casing, a second glass panel sealingly secured to the other edge of said first ring, a second ring sealingly mounted on the outer side of said second glass panel, fastening means sealably joining said glass panels and said first and second rings to said measuring chamber to define a contact chamber into which said one leg of said shaft extends, a radial contact arm carried by the end of said one leg in said contact chamber, said second panel having an opening therein, a second sealing bushing in said last mentioned opening, a straight shaft extending through said second bushing, a control knob for rotating said straight shaft on the extended end thereof, a radial contact plate secured to the end of said straight shaft in said contact chamber, a perpendicular contact arm carried by said contact plate extending into the path of radial movement of said radial contact arm, and oil filling said contact chamber.

References Cited in the file of this patent

UNITED STATES PATENTS

| | | |
|---|---|---|
| 1,307,189 | Downes et al. | June 17, 1919 |
| 2,203,766 | Baer et al. | June 11, 1940 |
| 2,239,071 | Zeller | Apr. 22, 1941 |
| 2,278,279 | Morris | Mar. 31, 1942 |
| 2,467,189 | Cohen et al. | Apr. 12, 1949 |
| 2,484,038 | Kirlin | Oct. 11, 1949 |
| 2,601,142 | Hubbard | June 17, 1952 |
| 2,623,143 | Laury | Dec. 23, 1952 |
| 2,877,318 | Culley | Mar. 10, 1959 |